(12) United States Patent
Im

(10) Patent No.: US 9,292,200 B2
(45) Date of Patent: Mar. 22, 2016

(54) TOUCH-ENABLED TERMINAL AND METHOD OF PROVIDING VIRTUAL KEYPAD FOR THE SAME

(75) Inventor: Moo Jin Im, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1110 days.

(21) Appl. No.: 13/075,675

(22) Filed: Mar. 30, 2011

(65) Prior Publication Data

US 2011/0246927 A1    Oct. 6, 2011

(30) Foreign Application Priority Data

Mar. 30, 2010   (KR) .................. 10-2010-0028725

(51) Int. Cl.
    *G06F 3/0482*    (2013.01)
    *G06F 3/0488*    (2013.01)
    *G06F 3/023*    (2006.01)

(52) U.S. Cl.
    CPC .......... *G06F 3/04886* (2013.01); *G06F 3/0236* (2013.01)

(58) Field of Classification Search
    CPC .................................................. G06F 3/04886
    See application file for complete search history.

(56) References Cited

U.S. PATENT DOCUMENTS

| | | | | |
|---|---|---|---|---|
| 8,335,993 | B1 * | 12/2012 | Tan .............................. | 715/773 |
| 2009/0265669 | A1 * | 10/2009 | Kida et al. .................... | 715/863 |
| 2010/0085313 | A1 * | 4/2010 | Rider ............................ | 345/173 |
| 2010/0245276 | A1 * | 9/2010 | Sim .............................. | 345/173 |
| 2011/0099506 | A1 * | 4/2011 | Gargi et al. ................... | 715/773 |

* cited by examiner

*Primary Examiner* — Namitha Pillai
(74) *Attorney, Agent, or Firm* — Jefferson IP Law, LLP

(57) ABSTRACT

A touch-enabled terminal and a keypad providing method for the same are provided. The method of providing a virtual keypad includes activating the virtual keypad in character input mode, performing first-stage presentation by focusing a first one of characters assigned to each one of plural buttons of the virtual keypad and displaying the focused characters, and performing, in response to a touch on a button of the virtual keypad, second-stage presentation by displaying a character entered by the touched button, focusing a next enterable character related to the touched button, and focusing next enterable characters related respectively to the other buttons. The touch-enabled terminal provides visual information regarding currently enterable characters through the virtual keypad with respect to the last entered button.

18 Claims, 5 Drawing Sheets

FIG. 2
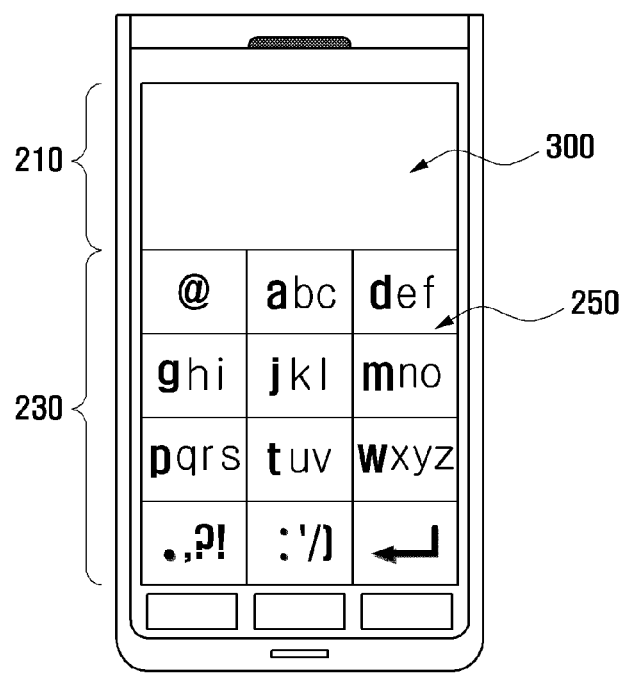
<201>
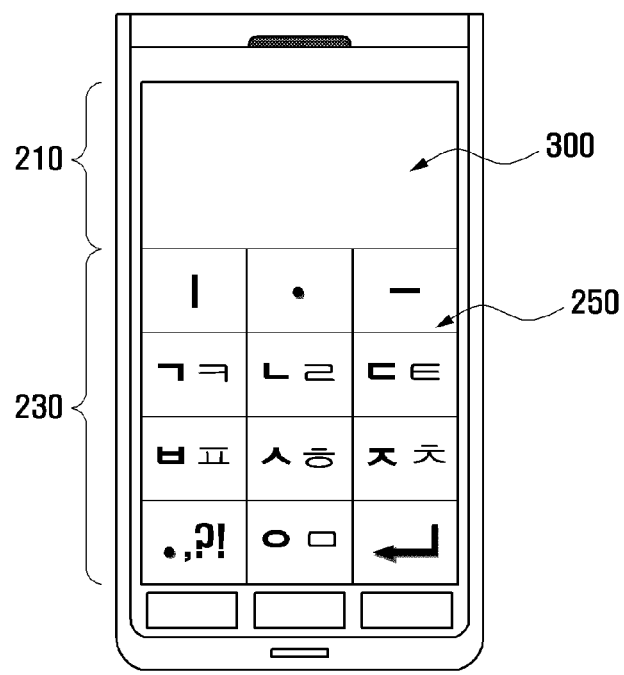
<203>

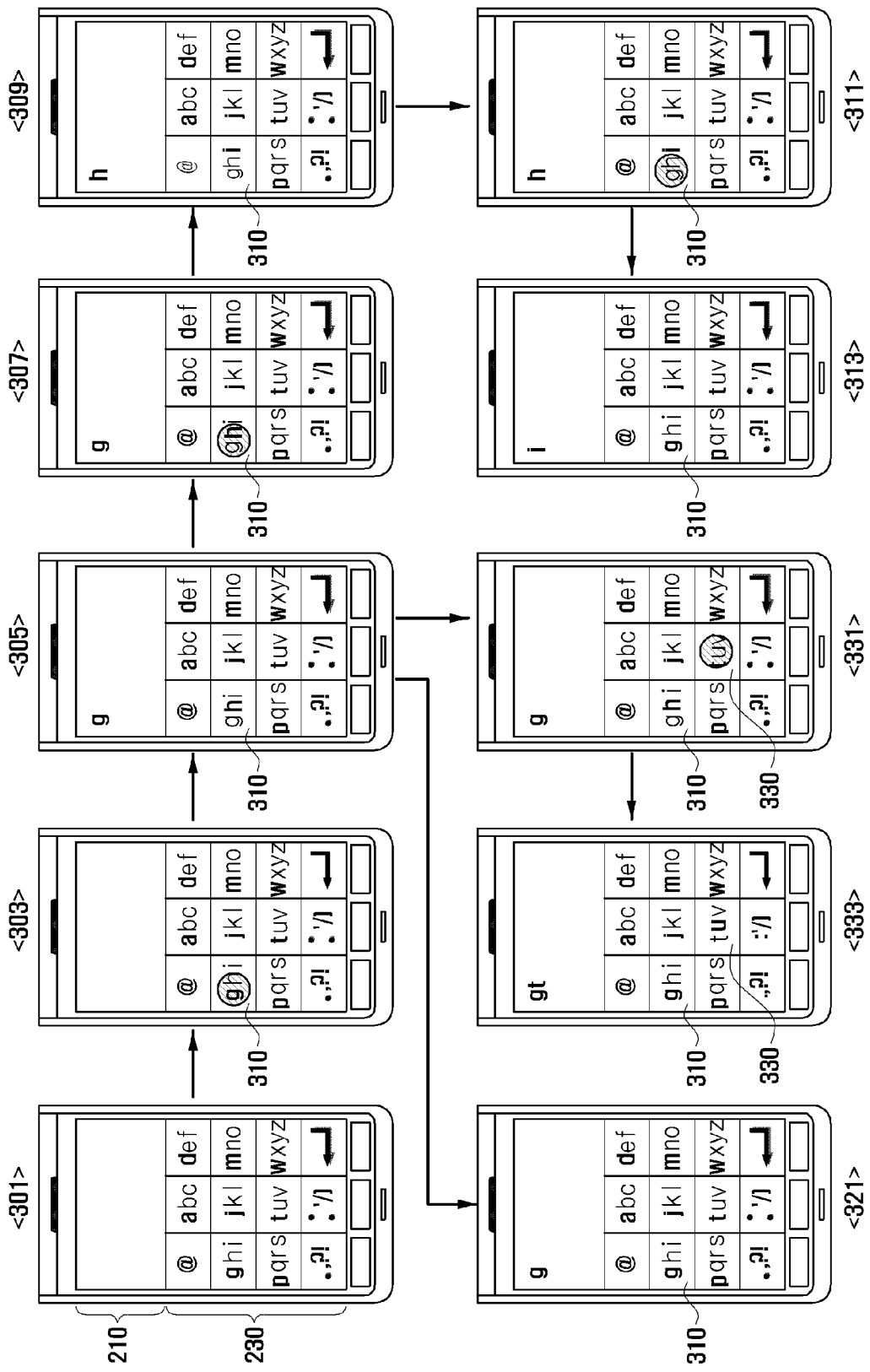

TOUCH-ENABLED TERMINAL AND METHOD OF PROVIDING VIRTUAL KEYPAD FOR THE SAME

PRIORITY

This application claims the benefit under 35 U.S.C. §119 (a) of a Korean patent application filed on Mar. 30, 2010 in the Korean Intellectual Property Office and assigned Ser. No. 10-2010-0028725, the entire disclosure of which is hereby incorporated by reference.

BACKGROUND OF THE INVENTION

1. Field of the Invention

The present invention relates to a touch-enabled terminal having a touch screen. More particularly, the present invention relates to a touch-enabled terminal and a keypad providing method for the same that present currently enterable characters of a virtual keypad in a readily viewable way during data entry through the virtual keypad.

2. Description of the Related Art

Rapid advances in communication and semiconductor technologies have led to the popularization of various types of mobile terminals. Also, high-end mobile terminals have evolved into mobile convergence devices supporting heterogeneous functions originating from distinct fields. For example, mobile communication terminals may support not only regular communication functions related to voice calls and messages but also multimedia functions related to mobile broadcast reception via DMB or DVB, music playback using an MP3 player, photography, Internet access, and a dictionary search.

Recently, numerous mobile terminals have become touch enabled. A touch-enabled terminal has a touch screen capable of both displaying data and inputting data. In such a touch-enabled terminal, characters may be entered through a virtual keypad displayed on the touch screen. The virtual keypad includes virtual buttons, each of which is mapped to one or more characters. Hence, for character input, the user may have to touch the same button several times until a desired character is displayed.

A standard touch-enabled terminal simply displays one or more characters mapped to virtual buttons of the virtual keypad. When entering data, the user tends to look at buttons of the virtual keypad rather than a display zone in which an entered character is displayed. In such a case, the user may have to remember the number of touches made on a particular button in order to enter a correct one of multiple characters assigned to the button. In addition, owing to imperfect touch recognition of the touch-enabled terminal, touching a button may not result in entering an assigned character. Hence, although remembering the number of touches made on a particular button, the user may still fail to enter a desired character because of a touch recognition error.

For example, when three characters are assigned to each button of the virtual keypad, to enter a second one of three characters assigned to a particular button, the user has to touch the button two times consecutively. However, during data entry, the user may fail to touch the button exactly two times by touching only once or three times. Furthermore, even though the user has touched the button exactly two times, an incorrect character may be entered owing to a touch recognition error.

SUMMARY OF THE INVENTION

An aspect of the present invention is to address the above-mentioned problems and/or disadvantages and to provide at least the advantages described below. Accordingly, an aspect of the present invention is to provide a method that enables a touch-enabled terminal to present currently enterable characters of a virtual keypad in a readily viewable way during data entry.

Another aspect of the present invention is to provide a touch-enabled terminal and a keypad providing method for the same that can reduce data entry errors by presenting currently enterable characters of a virtual keypad in a readily viewable way.

Yet another aspect of the present invention is to provide a character input environment for a touch-enabled terminal that enables accurate character input by placing a focus on a next enterable character of a specific button in the virtual keypad.

Still another aspect of the present invention is to provide a keypad providing method that can reduce data entry errors by presenting a next enterable character of a touched button in real time to thereby enhance usefulness and usability of a touch-enabled terminal.

In accordance with an aspect of the present invention, a method of providing a virtual keypad in a touch-enabled terminal is provided. The method includes activating the virtual keypad in character input mode, performing first-stage presentation by focusing a first one of characters assigned to each one of plural buttons of the virtual keypad and displaying the focused characters, and performing, in response to a touch on a button of the virtual keypad, second-stage presentation by displaying a character entered by the touched button, focusing a next enterable character related to the touched button, and focusing next enterable characters related respectively to the other buttons.

In accordance with another aspect of the present invention, a touch-enabled terminal is provided. The terminal includes a display unit for presenting a virtual keypad in character input mode and providing a display zone in which a character entered through the virtual keypad is displayed, and a control unit for performing first-stage presentation by focusing, upon activation of the virtual keypad, a first one of characters assigned to each one of plural buttons of the virtual keypad and displaying the focused characters, for performing, in response to a touch on a button of the virtual keypad, second-stage presentation by displaying, in response to a touch on a button, a character entered by the touched button and focusing a next enterable character related to the touched button, and for focusing next enterable characters related respectively to the other buttons.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 illustrates a virtual keypad for a touch-enabled terminal according to an exemplary embodiment of the present invention;

FIG. 3 illustrates a sequence of operations of a virtual keypad according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a touch-enabled terminal having a touch screen and a character presentation method using a virtual keypad thereof. In character input mode, the user of the touch-enabled terminal may readily identify currently enterable characters mapped to individual buttons of the virtual keypad. Hence, the user may accurately enter desired characters with reduced spelling and other errors. The virtual keypad is presented by the touch-enabled terminal in character input mode. The virtual keypad includes multiple virtual buttons, each of which has one or more assigned characters. A focus may be placed on one of characters assigned to a specific button that is currently enterable. In character input mode, the virtual keypad is activated to enable the user to enter characters for message composition, memo writing, mail composition or the like.

Next, a description is given of an exemplary configuration and operation of a touch-enabled terminal in connection with FIGS. 1 to 4B. However, the configuration of the touch-enabled terminal is not limited to or by the following description, and various changes and modifications are possible on the basis of the following description.

Figure 1:
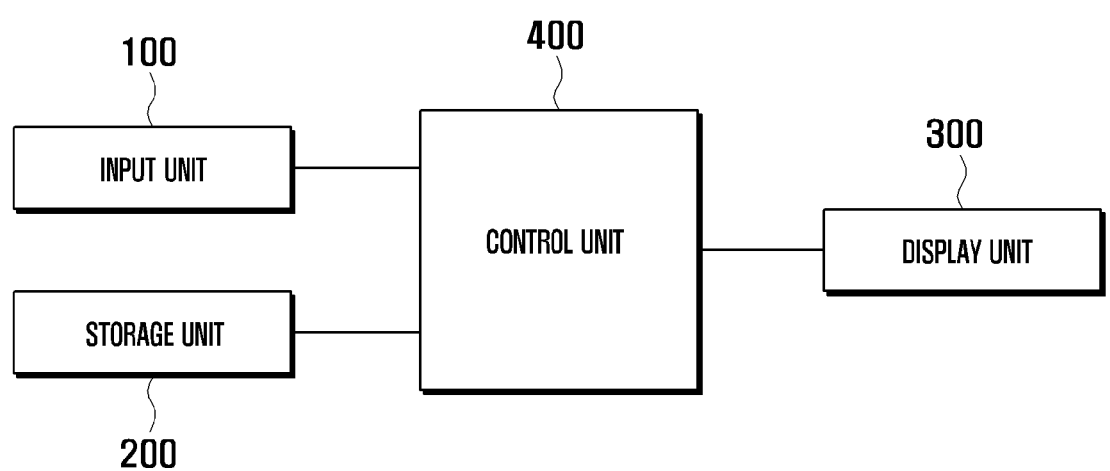
FIG. 1 is a block diagram of a touch-enabled terminal according to an exemplary embodiment of the present invention.

FIG. 1 is a block diagram of a touch-enabled terminal according to an exemplary embodiment of the present invention.

Referring to FIG. 1, the touch-enabled terminal includes an input unit 100, a storage unit 200, a display unit 300, and a control unit 400. The touch-enabled terminal may further include a radio frequency unit for communication functions, an audio processing unit including a microphone and a speaker, a digital broadcast receiver for receiving digital broadcasts based on DMV or DVB, a camera module for capturing an image, a Bluetooth module for short-range communication, and an Internet communication module for Internet access, and the like. However, these components are not directly related to the subject matter of the present invention and a description thereof will not be given.

The input unit 100 generates an input signal corresponding to a user action and forwards the input signal to the control unit 400. The input unit 100 may include a plurality of buttons, some of which are used to launch a specific application and to generate an input signal for activating character input mode.

The storage unit 200 stores programs executed by the touch-enabled terminal and data generated by the programs. The storage unit 200 may include one or more volatile and non-volatile memory devices. For example, the storage unit 200 stores an operating system for the touch-enabled terminal, a program and data for controlling operation of the display unit 300, an application and data for character input processing in character input mode, and an application and data for character display and focus operation of the virtual keypad in character input mode. The storage unit 200 stores information on mappings between buttons of the virtual keypad and characters, and permanently or temporarily stores information regarding operation of the virtual keypad in character input mode. For example, in character input mode, the storage unit 200 may store the number of touches on a particular button of the virtual keypad, the character corresponding to the number of touches, the position indicator (m) to characters assigned to the button, and the number of characters assigned to the button.

The display unit 300 displays application screens related to application functions supported by the touch-enabled terminal. The application screens may be related to messages, electronic mail, Internet access, multimedia, searches, communication, electronic books, moving images, photographs, mobile broadcasts such as DMB or DVB, music playback, and the like. The display unit 300 may be realized using Liquid Crystal Display (LCD) devices, Organic Light Emitting Diodes (OLED) or Active Matrix Organic Light Emitting Diodes (AMOLED). The display unit 300 may display screen data in portrait or landscape mode.

More particularly, the display unit 300 includes a touch screen as a touch input means. The display unit 300 presents a virtual keypad on the touch screen, generates an input signal corresponding to an action on the virtual keypad, and sends the input signal to the control unit 400. In character input mode, the display unit 300 displays a character corresponding to an input signal from the virtual keypad. The display unit 300 may provide an input zone to be used to enter characters through the virtual keypad, and a display zone to be used to display characters entered through the virtual keypad. This will be described in detail later.

The control unit 400 controls operations of the touch-enabled terminal. More particularly, the control unit 400 controls character input mode operations. In character input mode, the control unit 400 activates the virtual keypad, presents the same on the display unit 300, and performs character input processing according to an input signal from the virtual keypad. The control unit 400 may display a character entered through the virtual keypad in the display zone of the display unit 300.

The control unit 400 controls focus processing of characters assigned to the virtual keypad in character input mode. When the virtual keypad is activated in character input mode, the control unit 400 places a focus on the first one of characters assigned to each button of the virtual keypad. In the description, the word "focus" or "focusing" refers to clearly distinguishing one character from other characters assigned to a button of the virtual keypad. In other words, among plural characters assigned to each button of the virtual keypad, focusing refers to clearly distinguishing a currently enterable character from the other characters by utilizing at least one of relief, intaglio, color, size, typeface, shade, and the like.

When a button of the virtual keypad is touched, the control unit 400 displays the focused one of the characters assigned to the button in the display zone of the display unit 300, moves the focus to a next enterable one of the characters assigned to the button, and may keep focused characters of untouched buttons unchanged. For each button of the virtual keypad, focus movement may be handled in consideration of the number of characters assigned to the button.

For example, it may be assumed that three characters are assigned to a button and all assigned characters are enterable. Whenever the button is touched, the focus may be moved to the next character (first, second, third, first . . . ).

As another example, it may be assumed that three characters are assigned to a button, and the first two characters are enterable and the third character is hidden. When the button is touched, the focus may be moved from the first character to the second character as expected. When the button is touched once again, the first two characters are hidden, the third character is made visible, and the focus is placed on the third character. When the button is touched once again, the first two characters are made visible, the third character is hidden, and the focus is placed on the first character.

As another example, it may be assumed that three characters are assigned to a button and one of the assigned characters is visible. Whenever the button is touched, the focus may be moved to the next character (first, second, third, first . . . ) and the focused character is made visible.

After character display and focus handling in relation to a particular button of the virtual keypad, when a preset time expires or character input using the button is completed, the control unit 400 may reset the focuses to their initial states. At initial states, the focuses are respectively placed on the first ones of characters assigned to individual buttons of the virtual keypad. After character display and focus handling in relation to a first button of the virtual keypad, when a second button is touched, the control unit 400 may reset the focuses to their initial states and perform character display and focus handling in relation to the second button as described before.

The control unit 400 controls various other operations of the touch-enabled terminal. Control operations performed by the control unit 400 are described later in connection with the following drawings.

The touch-enabled terminal of FIG. 1 may be one of various types such as bar type, folder type, slide type, swing type and flip type according to design. The touch-enabled terminal of the present invention may be any form of information and communication appliance such as a mobile communication terminal supporting a communication protocol for a communication system, a Portable Multimedia Player (PMP), a digital broadcast receiver, a Personal Digital Assistant (PDA), a music player such as an MP3 player, a portable game console, and a smart phone. An exemplary virtual keypad providing method of the present invention may be applied to medium to large sized devices such as a television set, a large format display, digital signage, a media kiosk, a personal computer, and a laptop computer.

FIG. 2 illustrates a virtual keypad for a touch-enabled terminal according to an exemplary embodiment of the present invention.

Referring to FIG. 2, as indicated by reference symbols 201 and 203, a virtual keypad 250 is activated and presented on the display unit 300. The virtual keypad 250 of reference symbol 201 is for entering English characters, and the virtual keypad 250 of reference symbol 203 is for entering Korean characters. The language to be used (for example, English, Korean or other languages or numerals) may be selected by the user. In character input mode, the display unit 300 may provide a display zone 210 and an input zone 230. When the virtual keypad 250 is deactivated, the display zone 210 may be enlarged to full screen. The input zone 230 (i.e., the virtual keypad 250) may be overlaid on the display zone 210.

When transitioning to character input mode, the touch-enabled terminal may present the virtual keypad 250 according to a preset scheme. For example, entering a shortcut key of the input unit 100 or touching a specific zone of the display unit 300 may trigger presentation of the virtual keypad 250. The virtual keypad 250 may also be presented automatically in response to a transition to character input mode.

As indicated by reference symbols 201 and 203, the virtual keypad 250 includes a plurality of virtual buttons and at least one character is assigned to each button. Each button may display at least one of the assigned characters.

In character input mode, the virtual keypad 250 may take a form indicated by reference symbol 201 or 203. For example, in character input mode, buttons display characters corresponding to the selected language (for example, English or Korean). When the virtual keypad 250 is initially presented, focus is placed on the first one of the characters assigned to each button. For example, as indicated by reference symbol 201, characters '@', 'a', 'd', 'g', 'j', 'm', 'p', 't', 'w', '.', ':' and ' ' (first ones of at least one character assigned to individual buttons) are focused. As indicated by reference symbol 203 related to the Korean language, letters 'ㅣ', 'ㅡ', 'ㄱ', 'ㄴ', 'ㄷ', 'ㅂ', 'ㅅ', 'ㅈ', '.', 'ㅇ' and ' ' are focused. When a button of the virtual keypad 250 is touched, the corresponding focus is moved between the letters assigned to the touched button. Focus movement between characters assigned to one button is further described later.

The language to be used for the virtual keypad 250 may be toggled between Korean and English according to user selection. The number of characters assigned to each button may be varied according to input schemes. For example, one or more characters may be assigned to one button, and one or more ones of the characters assigned to the button may be visible in consideration of viewability. One of the characters assigned to the button may be hidden, and the hidden character may become visible on the button when it becomes enterable. For example, for the button having 'ㄱ ㅋ' indicated by reference symbol 203, two characters (strokes) 'ㄱ' and 'ㅋ' are visible, but three characters 'ㄱ ㅋ' and 'ㄲ' are actually assigned to the button. When the button is touched twice, the characters 'ㄱ ㅋ' are hidden and the hidden character 'ㄲ' is focused and becomes visible.

As described above, at least one character may be assigned to a button, and at least one of the assigned characters may be set to visible and the other assigned characters may be hidden. The buttons of the virtual keypad 250 may be arranged in various formats such as 3*4, 4*3 and Qwerty. In FIG. 2, the form of the virtual keypad 250, arrangement of buttons on the virtual keypad 250, characters assigned to each button and the number of assigned characters are illustrated only for the purpose of description.

FIG. 3 illustrates a sequence of operations of a virtual keypad according to an exemplary embodiment of the present invention.

Referring to FIG. 3, as indicated by reference symbol 301, a virtual keypad 250 is activated and presented on the display unit 300 in character input mode. The virtual keypad 250 in FIG. 3 is used to enter English characters. As described before, in character input mode, the display unit 300 may provide a display zone 210 and an input zone 230. The input zone 230 (i.e., the virtual keypad 250) may be overlaid on the display zone 210.

As indicated by reference symbol 301, when the virtual keypad 250 is initially activated and presented, focus is placed on the first one of characters assigned to each button. For example, characters '@', 'a', 'd', 'g', 'j', 'm', 'p', 't', 'w', '.', ':' and ' ' (first ones of at least one character assigned to individual buttons) are focused.

Touching a button of the virtual keypad 250 having a desired character causes the character to be input. For example, as indicated by reference symbol 303, the button 310 having assigned characters "ghi" may be touched using an object (a stylus, finger or the like). In other words, a gesture such as tap may be entered to the button 310 of the virtual keypad 250.

When the gesture is entered to the button 310, as indicated by reference symbol 305, the first one of the assigned characters ('g') is displayed in the display zone 210 of the display unit 300, the next enterable character ('h') is focused, and focuses related to other untouched buttons remain unchanged (i.e., first characters of other buttons '@', 'a', 'd', 'j', 'm', 'p', 't', 'w', '.', ':' and ' ' remain focused).

When another gesture is entered to the button 310 of the virtual keypad 250 as indicated by reference symbol 307, the second one of the assigned characters ('h') is displayed in the display zone 210 of the display unit 300 as indicated by reference symbol 309, the next enterable character ('i') is focused, and focuses related to other untouched buttons are kept unchanged (first characters of other buttons remain focused).

When another gesture is entered to the button 310 in a state of reference symbol 311, the third one of the assigned characters ('i') is displayed in the display zone 210 of the display unit 300 as indicated by reference symbol 313, the next enterable character ('g') is focused (the focus of the button 310 returns to the first assigned character), and focuses related to other untouched buttons are kept unchanged (first characters of other buttons remain focused).

When a preset time expires without user action in a state of reference symbol 305, the character entered by the button 310 ('g') is treated as completed input, and focuses related to all the buttons are initialized as indicated by reference symbol 321 (i.e., first characters of the buttons '@', 'a', 'd', 'g', 'j', 'm', 'p', 't', 'w', '.', ':' and ' ' are focused). Here, on the button 310, the focus is moved from the second character ('h') to the first character ('g').

In the virtual keypad 250, two different buttons may be entered in sequence. For example, when a gesture like tap is entered to a button 330 having "tuv" while the virtual keypad 250 is in a state of reference symbol 305, as indicated by reference symbol 331, the character entered by the button 310 ('g') is treated as completed input, the first one ('t') of the characters assigned to the button 330 is displayed next to 'g' in the display zone 210 of the display unit 300 as indicated by reference symbol 333, the next enterable character ('u') is focused on the button 330, and focuses related to other untouched buttons are initialized (i.e., first characters of the untouched buttons '@', 'a', 'd', 'g', 'j', 'm', 'p', 'w', '.', ':' and ' ' are focused). Here, on the button 310, the focus is moved from the second character ('h') to the first character, and on the button 330, the focus is moved from the first character ('t') to the second character ('u').

As described above, the virtual keypad 250 may provide information regarding currently enterable characters through focusing, and provides information regarding next enterable characters through focus movement in response to a touch on a particular button. That is, the virtual keypad 250 may provide an intuitive and visual guide to next enterable characters. Hence, the user may accurately input desired data while reducing spelling errors.

Figure 4A:
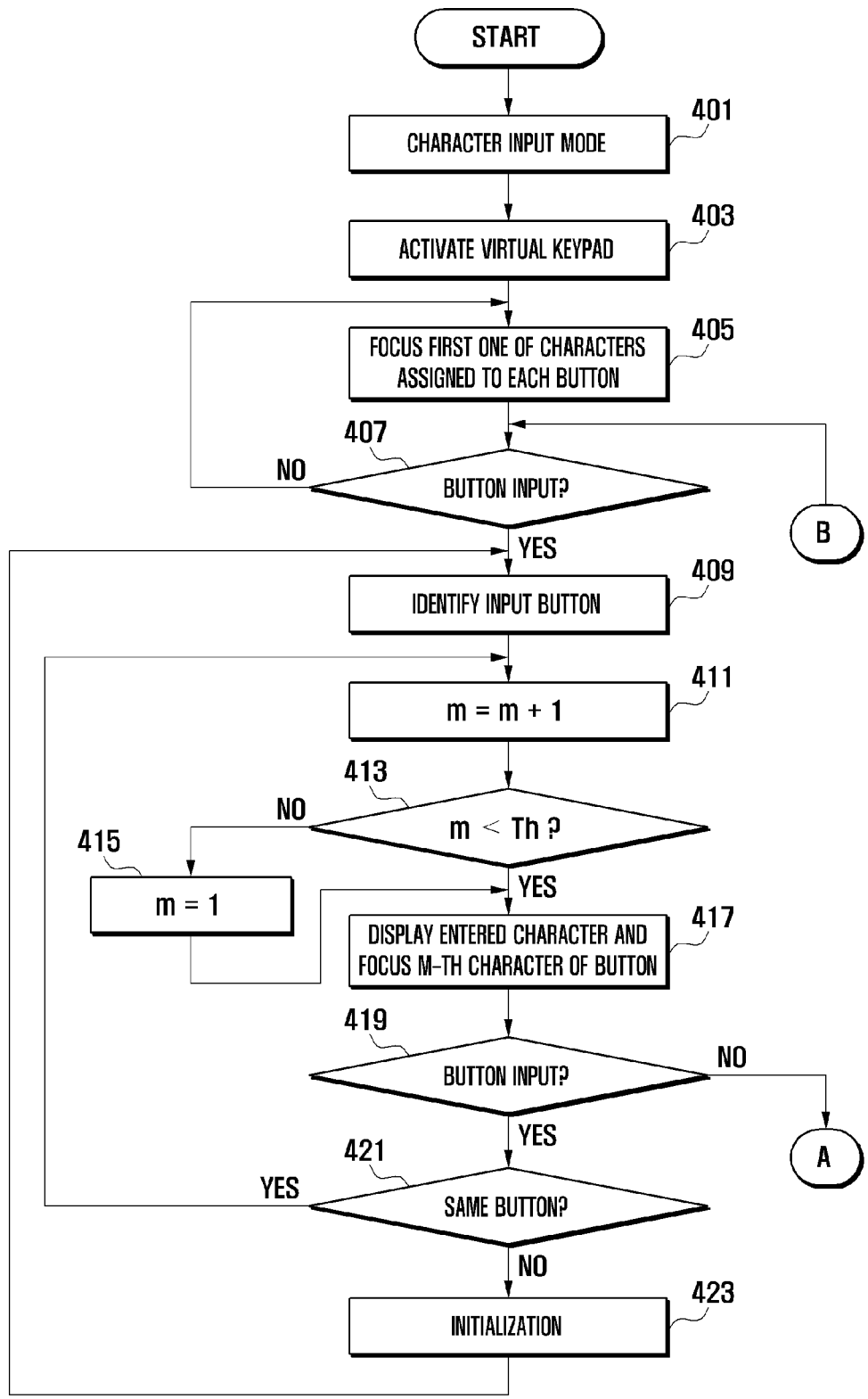
FIGS. 4A and 4B are a flowchart of a virtual keypad providing method for a touch-enabled terminal according to an exemplary embodiment of the present invention.
Figure 4B:
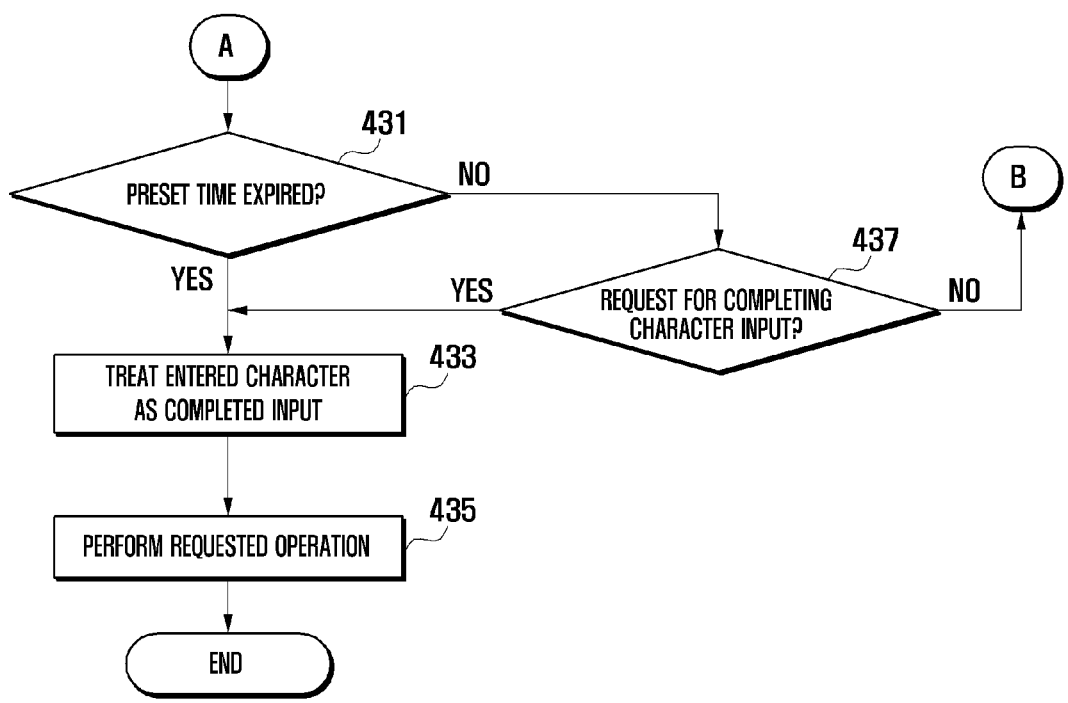

FIGS. 4A and 4B are a flowchart of a virtual keypad providing method for a touch-enabled terminal according to an exemplary embodiment of the present invention.

Referring to FIGS. 4A and 4B, the control unit 400 of the touch-enabled terminal enters into character input mode in step 401. In character input mode, the control unit 400 activates and presents the virtual keypad 250 in step 403. The control unit 400 may divide the display unit 300 into a display zone 210 and input zone 230, and present the virtual keypad 250 in the input zone 230. The control unit 400 places a focus on the first one of characters assigned to each button of the virtual keypad 250 in step 405. That is, first ones of characters assigned to individual buttons of the virtual keypad 250 are focused. For example, when a button is assumed to have assigned characters "ghi", the first character 'g' is focused as in "ghi". Such processing is applied to all the buttons of the virtual keypad 250. In other words, among plural characters assigned to each button of the virtual keypad 250, focusing refers to clearly distinguishing a currently enterable character from other characters by utilizing at least one of relief, intaglio, color, size, typeface and shade.

The control unit 400 determines whether a button is entered by a touch in step 407. If it is determined in step 407 that no button is entered, the control unit 400 returns to step 405. If it is determined in step 407 that a button is entered, the control unit 400 identifies the entered button in step 409. For example, when the user touches a button of the virtual keypad 250, the control unit 400 may identify characters assigned to the touched button. Here, the control unit 400 may record the entered button and the number of touches made to the button.

The control unit 400 determines the position indicator (m) of the character to be focused next among characters assigned to the touched button according to the number of touches made to the button in step 411. Here, the control unit 400 may increment m (position indicator to the currently focused character on the button) by 1 (m=m+1) to obtain the position indicator of the character to be focused next. The position indicator (m) is an integer value indicating the order of a character among characters assigned to a particular button. For a specific button, the position indicator (m) may have a maximum value equal to the number of characters assigned to the button (Th). For example, when a button has three assigned characters "ghi", m may have a maximum value of 3. When a button has four assigned characters "pqrs", m may have a maximum value of 4. The control unit 400 determines whether the position indicator (m) is less than or equal to the number of characters assigned to the button (Th) in step 413.

If it is determined in step 413 that the position indicator (m) exceeds the number of characters assigned to the button (Th), the control unit 400 reinitializes the position indicator to the character to be focused next (m=1) in step 415 and proceeds to step 417. Step 415 may be executed when only a single character is assigned to a button or when the control returns from step 421 (as indicated by reference symbols 311 and 313 in FIG. 3).

If it is determined in step 413 that the position indicator (m) does not exceed the number of characters assigned to the button (Th), the control unit 400 displays a character of the button corresponding to the number of touches (for example, 1) in the display zone 210 of the display unit 300, and places a focus on the character indicated by the position indicator (m) in step 417. That is, the m-th one of the characters assigned to the button is focused.

The control unit 400 determines whether a button is entered by a touch in step 419. If it is determined in step 419 that no button is entered, the control unit 400 proceeds to step 431 (described later). If it is determined in step 419 that a button is entered by a touch, the control unit 400 determines whether the entered button is the same as the previously entered button in step 421. The control unit 400 may determine the button entered by a gesture on the basis of an input signal generated by the button.

If it is determined in step 421 that the entered button is different from the previously entered button (i.e., a new button entered), the control unit 400 performs initialization in step 423. For example, the number of touches and focus positions may be initialized. That is, after initialization, on each button of the virtual keypad 250, the first one of the assigned characters is focused.

After initialization, the control unit 400 returns to step 409 and handles the newly entered button through subsequent steps. For example, it may be assumed that the previous button (first button) has assigned characters "ghi" with 'h' focused, and the new button (second button) has assigned characters "pqrs". When the second button is entered, the control unit 400 treats the character 'g' entered by the initial touch of the first button as completed input and initializes the focus related to the first button (that is, the first character 'g' of the first button is focused as in "ghi"). According to the initial touch of the second button, the first character 'p' among characters "pqrs" assigned to the second button is displayed in the display zone 210 (hence, characters "gp" are in the display zone 210), and the focus is moved from the first character 'p' to the second character 'q' (that is, on the second button of the virtual keypad 250, the second character 'q' is focused as in "pqrs".

If it is determined in step 421 that the entered button is the same as the previously entered button, the control unit 400 returns to step 411 and performs subsequent steps. According to repeated input of the same button, the control unit 400 may increment m (position indicator to the currently focused character on the button) by 1 (m=m+1) to obtain the position indicator to the character to be focused next.

For example, it may be assumed that the first button having assigned characters "ghi" is entered again. According to the second touch of the first button, the control unit 400 increments the number of touches by 1, displays the second character 'h' corresponding to the number of touches in the display zone 210 of the display unit 300, and increments the position indicator (m) by 1 to thereby move the focus from the second character 'h' to the third character 'i' (next enterable character). Hence, when the first button "ghi" is entered twice, the third character 'i' is focused as in "ghi". On the other buttons, first ones of the assigned characters are respectively focused. Accordingly, the virtual keypad 250 may provide, in real time, the user with information regarding next enterable characters with reference to the current button.

When no button is entered at step 419, the control unit 400 determines whether a preset time has expired from the last button input in step 431. If it is determined in step 431 that the preset time has expired, the control unit 400 treats the character input by the button entered at step 407 (for example, 'g') as completed input and performs initialization in step 433. For example, the number of touches and focus positions may be initialized. That is, after initialization, on each button of the virtual keypad 250, the first one of assigned characters is focused. Thereafter, the control unit 400 may perform a requested operation in step 435. For example, the control unit 400 may repeat the above procedure according to user gesture, or terminate character input mode or change the language (for example, from English to Korean) according to a user request.

When the preset time has not expired from the last button input, the control unit 400 determines whether a request for completing character input (for example, input of a space key) is issued in step 437. If it is determined in step 437 that a request for completing character input is not issued, the control unit 400 returns to step 407 and performs subsequent steps. If it is determined in step 437 that a request for completing character input is issued, the control unit 400 proceeds to step 433 and performs subsequent steps.

As apparent from the above description, exemplary embodiments of the present invention provide a touch-enabled terminal and a keypad providing method for the same that provides visual information regarding currently enterable characters through the virtual keypad with respect to the last entered button. More particularly, for a particular button having plural assigned characters, the next enterable character is focused in real time according to repeated entering of the button. Exemplary embodiments of the present invention provide a good character input environment for a touch-enabled terminal that enables intuitive and accurate character input by placing a focus on a next enterable character of a specific button in the virtual keypad. Exemplary embodiments of the present invention can reduce unexpected data entry errors to thereby enhance usefulness and usability of the touch-enabled terminal.

An exemplary method for providing a virtual keypad of the present invention may be implemented as a computer program and may be stored in various computer readable storage media. The computer readable storage media may store program instructions, data files, data structures and combinations thereof. The program instructions may include instructions developed specifically for the present invention and existing general-purpose instructions.

The computer readable storage media may include magnetic media such as a hard disk and floppy disk, optical media such as a CD-ROM and DVD, magneto-optical media such as a floptical disk, and memory devices such as a ROM and RAM. The program instructions may include machine codes produced by compilers and high-level language codes executable through interpreters.

The description of the various embodiments is to be construed as exemplary only and does not describe every possible instance of the invention. Therefore, it should be understood that various changes may be made and equivalents may be substituted for elements of the invention.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method of providing a virtual keypad in a touch-enabled terminal, the method comprising:

displaying a display zone and a virtual keypad wherein the virtual key-pad comprises at least one button in which plurality of characters are displayed;

displaying a first character of the plurality of characters of a first button in a visually different fashion as compared to the other characters of the plurality of characters of the first button;

receiving a first tap touch event on the first button of the at least one button; and displaying, in response to the first tap touch event, the first character on the display zone and a second character of the plurality of characters of the first button in a visually different fashion as compared to the other characters of the plurality of characters of the first button;

wherein the second character is a next enterable character with respect to the first character.

2. The method of claim 1, wherein the displaying of the first character of the plurality of characters of the first button in a visually different fashion as compared to the other characters of the plurality of characters of the first button comprises distinguishing, among characters assigned to the button, one character from the other characters by utilizing at least one of:
   relief;
   intaglio;
   color;
   size; and
   typeface.

3. The method of claim 1, wherein the displaying of the second character of the plurality of characters of the first button in a visually different fashion as compared to the other characters of the plurality of characters of the first button comprises distinguishing, among characters assigned to the button, one character from the other characters by utilizing at least one of:
   relief;
   intaglio;
   color;
   size; and
   typeface.

4. The method of claim 1, further comprising:
   receiving a second tap touch event on the first button of the at least one button; and
   displaying, in response to the second tap touch event, the second character of the plurality of characters of the first button in place of the first character on the display zone, and a third character of the plurality of characters of the first button in a visually different fashion as compared to the other characters of the plurality of characters of the first button,
   wherein the third character is a next enterable character with respect to the second character.

5. The method of claim 4, wherein the displaying the third character of the plurality of characters of the first button in a visually different fashion as compared to the other characters of the plurality of characters of the first button comprises distinguishing, among characters assigned to the button, one character from the other characters by utilizing at least one of:
   relief;
   intaglio;
   color;
   size; and
   typeface.

6. The method of claim 4, further comprising determining whether the third character is a last character of the first button,
   wherein the next enterable character with respect to the third character is the first character if the third character is the last character of the first button.

7. The method of claim 1, further comprising displaying, if a selecting input of a second button other than the first button is detected on the virtual keypad, a first character of the second button to be located next to the already selected character corresponding to the first button which has been displayed on the display zone.

8. The method of claim 7, further comprising:
   if the selecting input of the second button other than the first button is detected on the virtual keypad;
   displaying a second character of the second button in a visually different fashion as compared to the other characters of the plurality of characters of the second button; and
   displaying the first character of the first button in a visually different fashion as compared to the other characters of the plurality of characters of the first button.

9. The method of claim 4, further comprising displaying, when the second tap touch event does not occur within a predetermined time period or a request for completing character input is issued, the first character of the first button in a visually different fashion as compared to the other characters of the plurality of characters of the first button.

10. A touch-enabled terminal comprising; a display unit and a control unit configured to;
   cause the display unit to display a display zone and a virtual keypad wherein the virtual keypad comprises at least one button in which plurality of characters are displayed,
   cause the display unit to display a first character of the plurality of characters of a first button in a visually different fashion as compared to the other characters of the plurality of characters of the first button,
   receive a first tap touch event on the first button of the at least one button, and
   cause the display unit to display, in response to the first tap touch event, the first character on the display zone and a second character of the plurality of characters of the first button in a visually different fashion as compared to the other characters of the plurality of characters of the first button,
   wherein the second character is a next enterable character with respect to the first character.

11. The touch-enabled terminal of claim 10, wherein the control unit is further configured to cause the display unit to display the first character of the plurality of characters of the first button in a visually different fashion as compared to the other characters of the plurality of characters of the first button by utilizing at least one of:
   relief;
   intaglio;
   color;
   size; and
   typeface.

12. The touch-enabled terminal of claim 10, wherein the control unit is further configured to cause the display unit to display the second character of the plurality of characters of the first button in a visually different fashion as compared to the other characters of the plurality of characters of the first button by utilizing at least one of:
   relief;
   intaglio;
   color;
   size; and
   typeface.

13. The touch-enabled terminal of claim 10, wherein the control unit is further configured to:
   receive a second tap touch event on the first button of the at least one button; and
   cause the display unit to display, in response to the second tap touch event, the second character of the plurality of characters of the first button in place of the first character on the display zone, and a third character of the plurality of characters of the first button in a visually different fashion as compared to the other characters of the plurality of characters of the first button,
wherein the third character is a next enterable character with respect to the second character.

14. The touch-enabled terminal of claim 13, wherein the control unit is further configured to cause the display unit to display the third character of the plurality of characters of the first button in a visually different fashion as compared to the other characters of the plurality of characters of the first button by utilizing at least one of:
   relief;
   intaglio;
   color;
   size; and
   typeface.

15. The touch-enabled terminal of claim 13,
wherein the control unit is configured to determine whether the third character is a last character of the first button, and
wherein the next enterable character with respect to the third character is the first character if the third character is the last character of the first button.

16. The touch-enabled terminal of claim 10, wherein the control unit is configured to cause the display unit to display, if a selecting input of a second button other than the first button is detected on the virtual keypad, a first character of the second button to be located next to the already selected character corresponding to the first button which has been displayed on the display zone.

17. The touch-enabled terminal of claim 16,
wherein the control unit is configured to cause the display unit to display, if the selecting input of the second button other than the first button is detected on the virtual keypad,
   a second character of the second button in a visually different fashion as compared to the other characters of the plurality of characters of the second button, and
   the first character of the first button in a visually different fashion as compared to the other characters of the plurality of characters of the first button.

18. The touch-enabled terminal of claim 13, wherein the control unit is configured to cause the display unit to display, when the second touch event does not occur within a predetermined time period or a request for completing character input is issued, the first character of the first button in a visually different fashion as compared to the other characters of the plurality of characters of the first button.

* * * * *